June 3, 1930.  J. W. REUTTER  1,761,366
PISTON PIN VISE
Filed Dec. 14, 1928
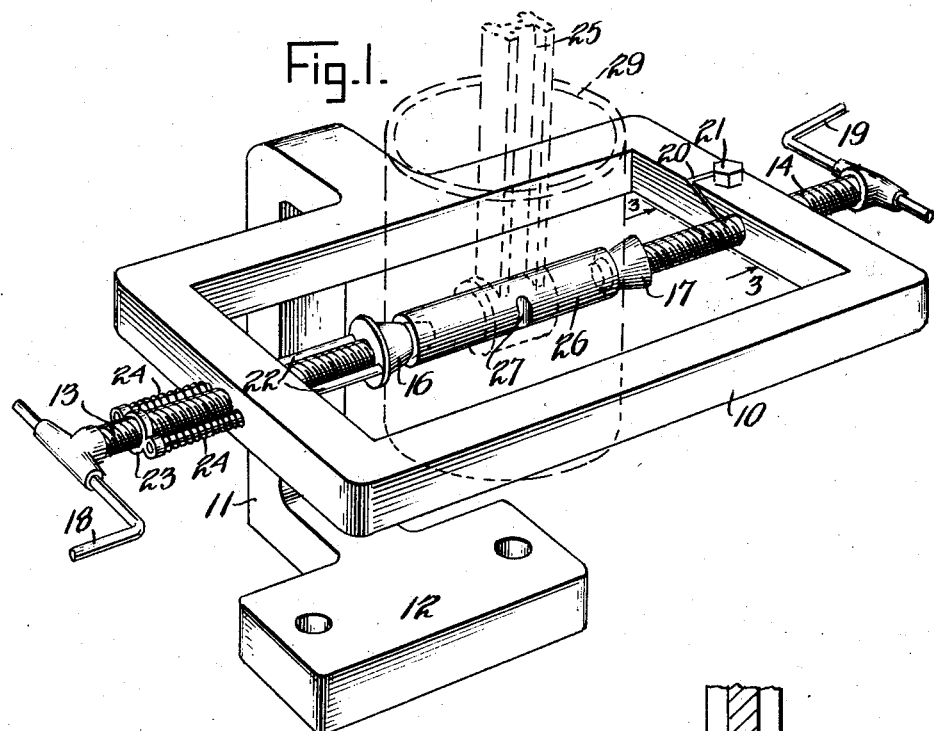
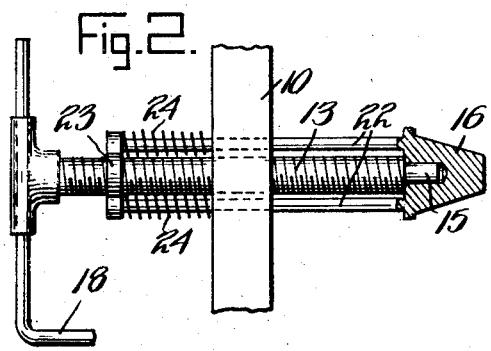
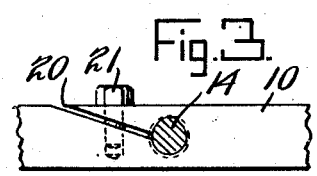
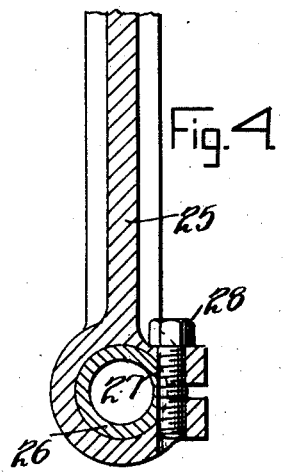
Inventor
John W. Reutter
By
Attorney Patented June 3, 1930

1,761,366

UNITED STATES PATENT OFFICE

JOHN WILLIAM REUTTER, OF WILMINGTON, DELAWARE

PISTON-PIN VISE

Application filed December 14, 1928. Serial No. 326,060.

My invention relates to a piston-pin vise or other mechanism for holding securely against movement a piston pin or wrist pin. It is well known that in applying a connecting rod to a piston pin or wrist pin that considerable difficulty is experienced in holding the pin so that the pin and its associated connecting rod may be brought into proper relationship to permit the application of the anchor screw. This is caused by the necessity for first applying the pin to its piston where it may freely turn and then applying the connecting rod to such rotatable pin in a manner such that the pin is held in fixed relation by the connecting rod and forms a pivotal support for the piston.

It is an object of the invention to provide a simple and inexpensive piston-pin vise which will firmly hold a piston pin or wrist pin in a fixed non-rotatable position to facilitate the attachment of the connecting rod and the alining of the parts so that the anchor screw may be applied and the connecting rod fastened to the pin; all as will be hereinafter more particularly specified and claimed.

Referring to the accompanying drawings, which are made a part hereof and on which similar reference characters indicate similar parts, Figure 1 is a perspective illustrating one application of my invention and its method of use;

Figure 2, an enlarged fragmentary detail;

Figure 3, a fragmentary section on the line 3—3 of Fig. 1; and

Figure 4, a section through a connecting rod and piston pin and illustrating the manner in which they are connected.

In the drawings reference character 10 indicates a frame of elongated rectangular construction having a supporting arm 11 and a bracket 12, said bracket being attachable by any desired fastening means to a work-bench, or if desired, the arm 11 may be clamped in a bench vise for supporting the device in a position for use.

A screw 13 is threaded through one end of the frame 10 and a similar screw 14 is threaded through the opposite end of the frame 10, said screws 13 and 14 being disposed in alinement, the screw 13 being provided with a reduced extremity 15 upon which is swivelly mounted a floating cap or center 16, and the screw 14 being also provided with a cap 17. The screw 13 is provided with a handle 18 by means of which it may be rotated for advancing or retracting the screw through the end of the frame. The screw 14 is likewise provided with a handle 19 for a similar purpose. In order to lock one of the screws in adjusted position the frame is provided with an inclined slot 20 and a cap screw 21 extends across the slot and is adapted to be operated to bind the parts together and cramp the screw 14.

The head 16 is provided with a pair of rearwardly extending guide rods 22 which extend through the end member of the frame 10 and prevent the head from rotating, such guide rods being connected at their outer ends to a yoke or collar 23 adjacent the handle 18. Upon each guide rod is mounted a coil spring 24 which engages the end of the frame and the yoke or collar 23 and tends to maintain the head 16 in retracted position.

In Fig. 4 I have shown a portion of a conventional connecting rod 25 and a conventional hollow piston pin or wrist pin 26, said pin being provided with a recess 27 for the reception of the body of an anchor screw 28.

It will be understood from the above that I have provided a device which is useful for holding piston pins while the connecting rods 25 are being applied, the operation being simplified on account of the ease with which the pin 26 is held and the ease with which the connecting rod 25 may be attached, the pin being held in a horizontal position so that light will shine into the end of the piston 29, shown in dotted lines in Fig. 1.

It will be obvious to those skilled in the art that various changes may be made in my device without departing from the spirit of the invention, and I therefore do not limit myself to what is shown in the drawings and described in the specification, but only as set forth in the appended claims.

Having thus fully described my said inven- tion, what I claim as new and desire to secure by Letters Patent, is:

1. A piston-pin vise comprising an elongated frame, longitudinally movable members extending through the ends of the frame and terminating in opposed relation for engaging a piston pin, means for securing one of said longitudinally movable members against movement, a floating member carried by the other longitudinally movable member, a pair of opposed guide pins connected to said member and extending through the end of the frame, a yoke connecting the free ends of the pins, and spring means confined between the yoke and the end of the frame for maintaining the floating member in retracted position for engagement with the extremity of the associated longitudinally movable member, substantially as set forth.

2. A piston-pin vise comprising an elongated frame, longitudinally adjustable members extending through the ends of the frame and terminating in opposed piston-pin engaging jaws, means for securing one of said longitudinally movable members in fixed position, the jaw carried by the other member being floating, a pair of opposed guide rods connected to said floating jaw and extending through the end of the frame, a collar connecting the free ends of the rods, and spring means confined between the collar and the end of the frame for maintaining the floating jaw in retracted position against the extremity of the associated longitudinally movable member, substantially as set forth.

3. A piston-pin vise comprising a frame, jaw supporting members carried by said frame in opposed relation and being adjustable toward and from each other, a jaw carried by one of said members, a floating jaw swivelly mounted on the other of said members, means tending to retract said floating jaw and maintain it against its supporting member, and means for securing one of said jaw supporting members against longitudinal movement, substantially as set forth.

4. A piston-pin vise comprising a frame, jaw supporting members carried by said frame in opposed relation and being adjustable toward and from each other, a jaw carried by one of said members, a floating jaw carried by the other of said members, means tending to retract said floating jaw and maintain it against its supporting member, means for securing one of said jaw supporting members against longitudinal movement, and a supporting arm for said frame integral with the same and adapted to be secured in a vise for holding the device in operative position, substantially as set forth.

5. A piston-pin vise comprising a frame, jaw supporting members carried by said frame in opposed relation and being adjustable toward and from each other, a jaw carried by one of said members, a floating jaw carried by the other of said members, means tending to retract said floating jaw and maintain it against its supporting member, means for securing one of said jaw supporting members against longitudinal movement, a supporting arm for said frame integral with the same and adapted to be secured in a vise for holding the device in operative position, said arm having an attaching base for the application of securing means by which the device may be secured upon a support, substantially as set forth.

6. A device of the class described comprising a frame, a pair of opposed longitudinally movable screws extending through opposite portions of the frame, a handle on the remote end of each screw and rotatable for advancing and retracting the screw through the frame, means for cramping one of said screws to prevent its operation, a floating jaw swivelly mounted on the inner end of the other screw, guide means for preventing rotation of said floating jaw, and spring means for retracting said floating jaw, substantiallly as set forth.

7. A device of the class described comprising a frame, a pair of opposed longitudinally movable screws extending through opposite portions of the frame, a handle on the remote end of each screw and rotatable for advancing and retracting the screw through the frame, means for cramping one of said screws to prevent its operation, a floating jaw swivelly mounted on the inner end of the other screw, guide means for preventing rotation of said floating jaw, spring means for retracting said floating jaw, and a supporting arm for said frame integral with the same and adapted to be secured in a vise for holding the device in operative position, substantially as set forth.

8. A device of the class described comprising a frame, a pair of opposed longitudinally movable screws extending through opposite portions of the frame, a handle on the remote end of each screw and rotatable for advancing and retracting the screw through the frame, means for cramping one of said screws to prevent its operation, a floating jaw swivelly mounted on the inner end of the other screw, guide means for preventing rotation of said floating jaw, spring means for retracting said floating jaw, and a supporting arm for said frame integral with the same and adapted to be secured in a vise for holding the device in operative position, said arm having an attaching base for the application of securing means by which the device may be secured upon a support, substantially as set forth.

In witness whereof, I have hereunto set my hand and seal at Wilmington, Delaware, this twelfth day of December, A. D. nineteen hundred and twenty-eight.

JOHN W. REUTTER.